(12) United States Patent
Wen et al.

(10) Patent No.: US 11,768,712 B2
(45) Date of Patent: Sep. 26, 2023

(54) METHOD AND SYSTEM FOR OPTIMIZING PARAMETER CONFIGURATION OF DISTRIBUTED COMPUTING JOB

(71) Applicant: Tsinghua University, Beijing (CN)

(72) Inventors: Lijie Wen, Beijing (CN); Zan Zong, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/791,472

(22) PCT Filed: Oct. 20, 2021

(86) PCT No.: PCT/CN2021/124856
§ 371 (c)(1),
(2) Date: Jul. 7, 2022

(87) PCT Pub. No.: WO2022/121518
PCT Pub. Date: Jun. 16, 2022

(65) Prior Publication Data
US 2023/0042890 A1 Feb. 9, 2023

(30) Foreign Application Priority Data
Dec. 11, 2020 (CN) .......................... 202011436978.4

(51) Int. Cl.
*G06F 9/50* (2006.01)
(52) U.S. Cl.
CPC .......... *G06F 9/5077* (2013.01); *G06F 9/5016* (2013.01); *G06F 9/5083* (2013.01);
(Continued)
(58) Field of Classification Search
CPC .... G06F 9/5077; G06F 9/5016; G06F 9/5083; G06F 2209/501; G06F 2209/5019; G06F 2209/505
See application file for complete search history.

(56) References Cited

U.S. PATENT DOCUMENTS
2014/0215487 A1 7/2014 Cherkasova et al.
2015/0277980 A1 10/2015 Ovsiankin et al.
(Continued)

FOREIGN PATENT DOCUMENTS
CN 103605662 A 2/2014
CN 110941489 A * 3/2020
(Continued)

OTHER PUBLICATIONS

Chen et al. "Machine learning-based configuration parameter tuning on hadoop system." 2015 IEEE International Congress on Big Data. IEEE, pp. 386-392 (Year: 2015).*
(Continued)

*Primary Examiner* — Meng Ai T An
*Assistant Examiner* — Willy W Huaracha
(74) *Attorney, Agent, or Firm* — CHIESA SHAHINIAN & GIANTOMASI PC (57) ABSTRACT

The present disclosure relates to a method and system for optimizing a parameter configuration of a distributed computing job. The method includes: obtaining job programs of different distributed computing jobs, and determining a key parameter configuration set; obtaining a cluster status during execution of the distributed computing job, randomly generating a sample data set based on the key parameter configuration set and the cluster status, and establishing a performance prediction model; correcting the performance prediction model by using a multi-objective genetic algorithm and an optimization module configured with an optimal configuration selection strategy; obtaining a job program of a to-be-optimized distributed computing job and a cluster status during execution of the to-be-optimized distributed computing job, and determining a to-be-optimized key parameter configuration item combination; and inputting, to the performance prediction model, the to-be-opti- (Continued)

mized key parameter configuration item combination and the cluster status during execution of the to-be-optimized distributed computing job, and outputting a key parameter configuration item combination with a shortest execution time. The present disclosure can rapidly and effectively optimize the key parameter configuration.

6 Claims, 6 Drawing Sheets

(52) U.S. Cl.
CPC .. *G06F 2209/501* (2013.01); *G06F 2209/505* (2013.01); *G06F 2209/5019* (2013.01)

(56) References Cited

U.S. PATENT DOCUMENTS

| 2015/0370603 | A1 | 12/2015 | Fuller et al. | |
|---|---|---|---|---|
| 2017/0169336 | A1* | 6/2017 | Singhal | G06F 16/9024 |
| 2017/0192824 | A1 | 7/2017 | Gupta et al. | |
| 2021/0124860 | A1* | 4/2021 | Du | G06F 30/27 |
| 2021/0342698 | A1* | 11/2021 | Ouellet | G06F 16/9027 |

FOREIGN PATENT DOCUMENTS

| CN | 112540849 A | 3/2021 |
|---|---|---|
| WO | WO-2018206994 A1 | 11/2018 |

OTHER PUBLICATIONS

Thant et al. "Multi-objective Hadoop configuration optimization using steady-state NSGA-II." 2016 Joint 8th International Conference on Soft Computing and Intelligent Systems (SCIS) and 17th International Symposium on Advanced Intelligent Systems (ISIS). IEEE , pp. 293-298 (Year: 2016).*
International Search Report and Written Opinion dated Jan. 19, 2022 of International Patent Application PCT/CN2021/124856.
Wang Ting, Cost-based Configuration Optimization Analysis for Apache Spark, Full Text Database of Chinese Excellent Master's Dissertations, Information Technology Series, Full Text dated Aug. 15, 2019.

* cited by examiner

METHOD AND SYSTEM FOR OPTIMIZING PARAMETER CONFIGURATION OF DISTRIBUTED COMPUTING JOB

CROSS REFERENCE TO RELATED APPLICATION

The present application claims priority to and is a 35 U.S.C. 371 United States National Phase application based on International Patent Application No. PCT/CN2021/124856, filed Oct. 20, 2021, which claims priority to the Chinese Patent Application No. 2020114369784, filed with the China National Intellectual Property Administration (CNIPA) on Dec. 11, 2020, and entitled "METHOD AND SYSTEM FOR OPTIMIZING PARAMETER CONFIGURATION OF DISTRIBUTED COMPUTING JOB", the disclosures of all of these applications are incorporated herein by reference in their entireties.

TECHNICAL FIELD

The present disclosure relates to the field of parameter configuration optimization for a distributed computing job, and in particular, to a method and system for optimizing a parameter configuration of a distributed computing job.

BACKGROUND ART

A parameter configuration of a distributed computing job usually affects performance greatly. Setting a proper parameter value for a configuration item, such as a resource parameter configuration item or an execution parameter configuration item, may improve execution efficiency of the job. Compared with common parameter optimization, parameter optimization of a distributed computing job relates to a large quantity of parameters and a complex relationship between the parameters. There are more than 40 configuration items related to performance in a distributed memory computing framework which is most widely used currently. Currently, there are mainly two types of mainstream parameter optimization tools. For a first type tool, a search algorithm is used to explore parameter space of a configuration item. Values of the configuration item are enumerated in a reasonable order, and execution efficiencies of a job with the configuration item are verified successively. Usually, the search algorithm is important in this method. A reasonable parameter search sequence can reduce a possibility that searching falls into a local optimum. This type of method is suitable for a system that can quickly verify an effect of a configuration item.

For a second type tool, a configuration performance prediction model is constructed to replace directly verifying the effect of the configuration item. That is, the model is used to predict an execution time of a job with a specific configuration. This avoids actually executing the job. For this type of method, accuracy of the performance prediction model is critical. For most methods, a performance prediction problem may be converted to a regression problem. A machine learning algorithm is selected to construct a performance prediction model, so as to predict an execution time of a job with a given configuration. Combined with the search algorithm, the performance prediction model is used to explore the parameter space, so as to avoid verifying configuration performance by executing a job during a search process. This type of method significantly improves efficiency of configuration optimization, but requires additional overheads for constructing the performance model.

The prior art mainly has the following disadvantages:

1. In an existing solution, an amount of resource usage cannot be considered while an execution time of a job is optimized, thereby causing a memory resource waste.

2. Due to relatively low efficiency of existing configuration optimization, individual configuration optimization cannot be performed for each job, only frame-level optimization can be performed. Through experiments, it is found that optimal configurations of jobs are also different under different cluster loads. Because problems such as a dynamic change of cluster loads and low optimization efficiency are not considered in the existing tool, it is impossible to perform job-level optimization.

SUMMARY

The present disclosure aims to provide a method and system for optimizing a parameter configuration of a distributed computing job, so as to resolve problems that a memory resource is wasted and configuration optimization efficiency is low.

In order to achieve the above objective, the present disclosure provides the following technical solutions:

A method for optimizing a parameter configuration of a distributed computing job is provided, including:

obtaining job programs of different distributed computing jobs, and determining a key parameter configuration set based on the job programs of the different distributed computing jobs, where the key parameter configuration set includes multiple key parameter configuration item combinations and an execution time corresponding to each of the key parameter configuration item combinations, each of the key parameter configuration item combinations includes configuration items of multiple key parameters, and each of the key parameters is a parameter whose effect degree on an execution time of each of the distributed computing jobs is higher than an effect degree threshold;

obtaining a cluster status during execution of each of the distributed computing jobs, randomly generating a sample data set based on the key parameter configuration set and the cluster status, and establishing a performance prediction model by inputting a key parameter configuration item combination in the sample data set and the cluster status and by outputting the execution time corresponding to each of the key parameter configuration item combinations, where the performance prediction module is configured to determine a key parameter configuration item combination with a shortest execution time;

searching for an optimal configuration in a current cluster status based on the performance prediction model by using a multi-objective genetic algorithm and an optimization module configured with an optimal configuration selection strategy, where the optimization module is configured to simultaneously optimize the execution time and an amount of memory resource usage;

obtaining a job program of a to-be-optimized distributed computing job and a cluster status during execution of the to-be-optimized distributed computing job, and determining a to-be-optimized key parameter configuration item combination based on the job program of the to-be-optimized distributed computing job; and inputting, to the performance prediction model, the to-be-optimized key parameter configuration item combination and the cluster status during execution of the to-be-optimized distributed computing job, and outputting a key parameter configuration item combination with a shortest execution time of the to-be-optimized distributed computing job, where a key parameter configuration of each key parameter configuration item in the key parameter configuration item combination with a shortest execution time of the to-be-optimized distributed computing job is an optimal configuration of the to-be-optimized distributed computing job.

Optionally, the obtaining job programs of different distributed computing jobs, and determining a key parameter configuration set based on the job programs of the different distributed computing jobs specifically includes:

randomly generating multiple configuration item combinations within a parameter value range of each of configuration items, where the configuration items include a configuration item of a key parameter and a configuration item of an auxiliary parameter;

determining, based on any one of the job programs of the distributed computing jobs with reference to the configuration item combinations, an execution time corresponding to each of the configuration item combinations;

determining a key parameter based on the execution time by using a parameter of p-value and an impurity of a regression tree; and determining the key parameter configuration set based on the key parameter.

Optionally, the obtaining a cluster status during execution of each of the distributed computing jobs, randomly generating a sample data set based on the key parameter configuration set and the cluster status, and establishing a performance prediction model by inputting a key parameter configuration item combination in the sample data set and the cluster status and by outputting the execution time corresponding to each of the key parameter configuration item combinations specifically includes:

selecting multiple shallow fully connected neural networks as first-layer neural networks of the performance prediction model by using a cross-validation method, constructing a dual-layer model by using output of each of the first-layer neural networks as input of a second-layer linear regression layer, and training the sample data set by using the dual-layer model;

outputting a prediction result of each of the first-layer neural networks by using the key parameter configuration item combination in the sample data set and the cluster status as input of the first-layer neural networks; and establishing the performance prediction model by learning and training based on a linear regression model by mapping the prediction result as input of the second-layer linear regression layer to an execution time of the sample data set and by outputting the execution time corresponding to each of the key parameter configuration item combinations.

Optionally, the inputting, to the performance prediction model, the to-be-optimized key parameter configuration item combination and the cluster status during execution of the to-be-optimized distributed computing job, and outputting a key parameter configuration item combination with a shortest execution time of the to-be-optimized distributed computing job specifically includes:

determining an optimization result by inputting the randomly generated to-be-optimized key parameter configuration item combination and the sampled cluster status during execution of the to-be-optimized distributed computing job to the performance prediction model and by optimizing the execution time of the to-be-optimized distributed computing job based on an NSGA-II algorithm with an objective of the shortest execution time and the least amount of memory resource usage;

determining whether the optimization result meets a convergence condition, to obtain a first determining result, where the convergence condition is that searching stops if an optimal configuration obtained by searching based on the genetic algorithm does not change;

using the key parameter configuration item combination with a shortest execution time as an optimal solution when the first determining result indicates that the optimization result meets the convergence condition;

determining whether the optimal configuration exists in the optimal solution, to obtain a second determining result; and if the second determining result indicates that the optimal configuration exists in the optimal solution, obtaining a key parameter configuration item combination with the least amount of memory resource usage by discarding a key parameter configuration item with a performance level lower than a performance level threshold, or if the second determining result indicates that the optimal configuration does not exist in the optimal solution, outputting the key parameter configuration item combination with a shortest execution time of the to-be-optimized distributed computing job.

A system for optimizing a parameter configuration of a distributed computing job is provided, including:

a module for determining a key parameter configuration set, configured to: obtain job programs of different distributed computing jobs, and determine a key parameter configuration set based on the job programs of the different distributed computing jobs, where the key parameter configuration set includes multiple key parameter configuration item combinations and an execution time corresponding to each of the key parameter configuration item combinations, each of the key parameter configuration item combinations includes configuration items of multiple key parameters, and each of the key parameters is a parameter whose effect degree on an execution time of each of the distributed computing jobs is higher than an effect degree threshold;

a module for training a performance prediction model, configured to: obtain a cluster status during execution of each of the distributed computing jobs, randomly generate a sample data set based on the key parameter configuration set and the cluster status, and establish a performance prediction model by inputting a key parameter configuration item combination in the sample data set and the cluster status and by outputting the execution time corresponding to each of the key parameter configuration item combinations, where the performance prediction module is configured to determine a key parameter configuration item combination with a shortest execution time;

a configuration search module, configured to search for an optimal configuration in a current cluster status based on the performance prediction model by using a multi-objective genetic algorithm and an optimization module configured with an optimal configuration selection strategy, where the optimization module is configured to simultaneously optimize the execution time and an amount of memory resource usage;

a module for determining a to-be-optimized key parameter configuration item combination, configured to: obtain a job program of a to-be-optimized distributed computing job and a cluster status during execution of the to-be-optimized distributed computing job, and determine a to-be-optimized key parameter configuration item combination based on the job program of the to-be-optimized distributed computing job; and an optimal configuration determining module, configured to input, to the performance prediction model, the to-be-optimized key parameter configuration item combination and the cluster status during execution of the to-be-optimized distributed computing job, and output a key parameter configuration item combination with a shortest execution time of the to-be-optimized distributed computing job, where a key parameter configuration of each key parameter configuration item in the key parameter configuration item combination with a shortest execution time of the to-be-optimized distributed computing job is an optimal configuration of the to-be-optimized distributed computing job.

Optionally, the module for determining a key parameter configuration set specifically includes:

a unit for generating a configuration item combination, configured to randomly generate multiple configuration item combinations within a parameter value range of each of configuration items, where the configuration items include a configuration item of a key parameter and a configuration item of an auxiliary parameter;

an execution time determining unit, configured to determine, based on any one of the job programs of the distributed computing jobs with reference to the configuration item combinations, an execution time corresponding to each of the configuration item combinations;

a key parameter determining unit, configured to determine a key parameter based on the execution time by using a parameter of p-value and an impurity of a regression tree; and a unit for determining a key parameter configuration set, configured to determine a key parameter configuration set based on the key parameter.

Optionally, the module for training a performance prediction model specifically includes:

a unit for constructing a neural network-based double-layer model, configured to: select multiple shallow fully connected neural networks as first-layer neural networks of the performance prediction model by using a cross-validation method, construct a dual-layer model by using output of each of the first-layer neural networks as input of a second-layer linear regression layer, and train the sample data set by using the dual-layer model;

a unit for outputting a prediction result of a first-layer neural network, configured to output a prediction result of each of the first-layer neural networks by using the key parameter configuration item combination in the sample data set and the cluster status as input of the first-layer neural networks; and a unit for constructing a performance prediction model, configured to establish the performance prediction model by learning and training based on a linear regression model by mapping the prediction result as input of the second-layer linear regression layer to an execution time of the sample data set and by outputting the execution time corresponding to each of the key parameter configuration item combinations.

Optionally, the optimal configuration determining module specifically includes:

an optimization result determining unit, configured to determine an optimization result by inputting the randomly generated to-be-optimized key parameter configuration item combination and the sampled cluster status during execution of the to-be-optimized distributed computing job to the performance prediction model and by optimizing the execution time of the to-be-optimized distributed computing job based on an NSGA-II algorithm with an objective of the shortest execution time and the least amount of memory resource usage;

a first judgment unit, configured to determine whether the optimization result meets a convergence condition, so as to obtain a first determining result, where the convergence condition is that searching stops if an optimal configuration obtained by searching based on the genetic algorithm does not change;

an optimal solution determining unit, configured to use the key parameter configuration item combination with a shortest execution time as an optimal solution when the first determining result indicates that the optimization result meets the convergence condition;

a second judgment unit, configured to determine whether the optimal configuration exists in the optimal solution, so as to obtain a second determining result;

a first unit for determining a key parameter configuration item combination, configured to: if the second determining result indicates that the optimal configuration exists in the optimal solution, obtain a key parameter configuration item combination with the least amount of memory resource usage by discarding a key parameter configuration item with a performance level lower than a performance level threshold; and a second unit for determining a key parameter configuration item combination, configured to: if the second determining result indicates that the optimal configuration does not exist in the optimal solution, output the key parameter configuration item combination with a shortest execution time of the to-be-optimized distributed computing job.

According to the specific embodiments provided in the present disclosure, the present disclosure discloses the following technical effects. The present disclosure provides the method and system for optimizing a parameter configuration of a distributed computing job. The key parameters are obtained based on offline parameter selection, a key parameter configuration set is determined, and sample collection is performed. The distributed computing job is often an analysis task that is periodically executed and periodically triggered. Different data is input to a same program, so as to perform logical calculations. A sample in the sample data set is trained based on a machine learning algorithm, so as to obtain the performance prediction model for predicting the execution time of the job. Finally, based on the performance prediction model, combined with the multi-objective search algorithm, a configuration optimization service for a current cluster load status is provided online for the to-be-optimized job, so as to determine the optimal configuration. This realizes fast and effective key parameter configuration optimization, and simultaneously reduces a resource waste.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following descriptions show merely some embodiments of the present disclosure, and those of ordinary skill in the art may still derive other accompanying drawings from these accompanying drawings without creative efforts.

601 is a module for determining a key parameter configuration set, 602 is a module for training a performance prediction model, 603 is a configuration search module, 604 is a module for determining a to-be-optimized key parameter configuration item combination, and 605 is an optimal configuration determining module.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other examples obtained by a person of ordinary skill in the art based on the examples of the present disclosure without creative efforts shall fall within the protection scope of the present disclosure.

The present disclosure aims to provide a method and system for optimizing a parameter configuration of a distributed computing job, so as to rapidly and effectively optimize a key parameter configuration, and reduce a memory resource waste.

To make the above-mentioned objective, features, and advantages of the present disclosure clearer and more comprehensible, the present disclosure will be further described in detail below in conjunction with the accompanying drawings and specific embodiments.

Figure 1:
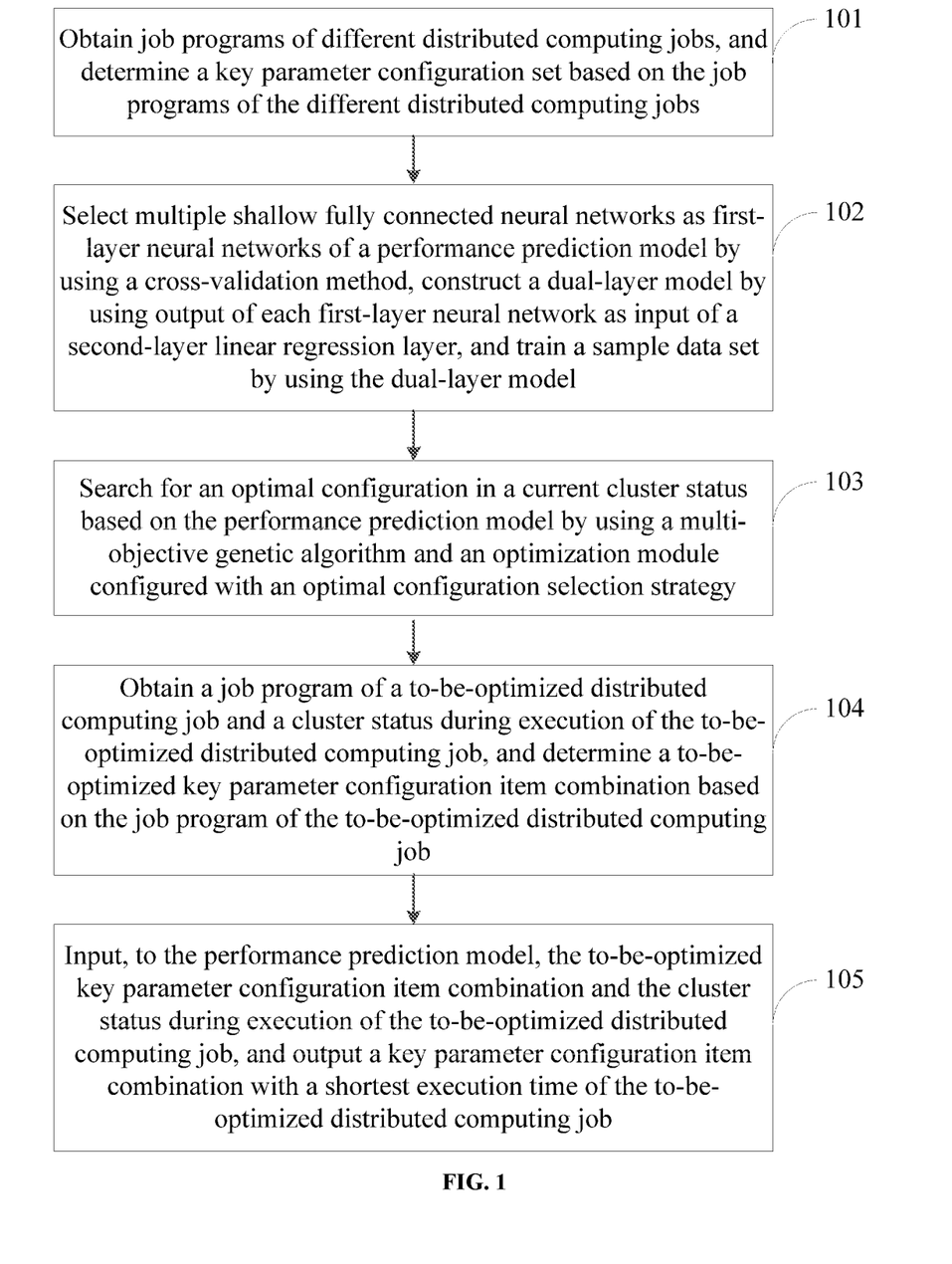
FIG. 1 is a flowchart of a method for optimizing a parameter configuration of a distributed computing job according to the present disclosure.
Figure 2:
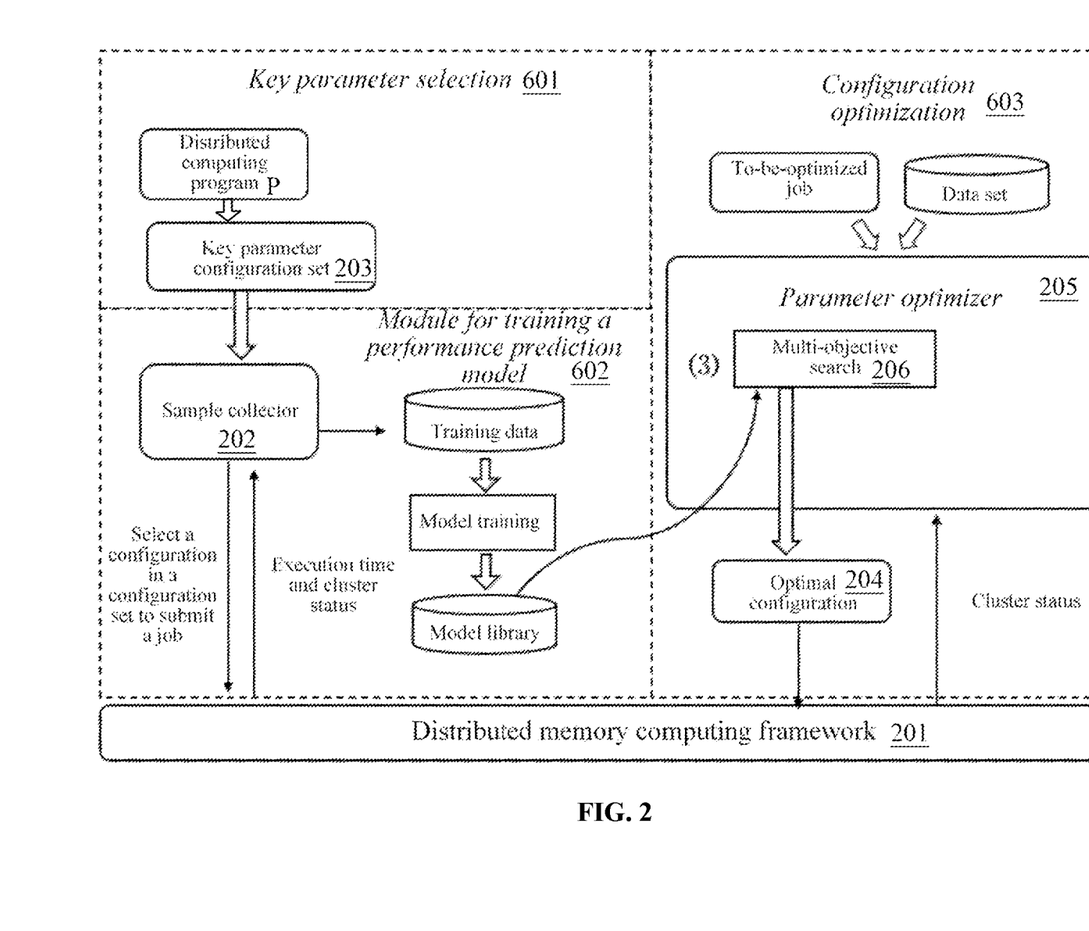
FIG. 2 is an architectural diagram for optimizing a parameter configuration of a distributed computing job according to the present disclosure.

FIG. 1 is a flowchart of a method for optimizing a parameter configuration of a distributed computing job according to the present disclosure. FIG. 2 is an architectural diagram for optimizing a parameter configuration of a distributed computing job according to the present disclosure. As shown in FIG. 1 and FIG. 2, a method for optimizing a parameter configuration of a distributed computing job includes:

Step 101: Obtain job programs of different distributed computing jobs, and determine a key parameter configuration set 203 based on the job programs of the different distributed computing jobs. The key parameter configuration set includes multiple key parameter configuration item combinations and an execution time corresponding to each of the key parameter configuration item combinations. Each key parameter configuration item combination includes configuration items of multiple key parameters. Each key parameter is a parameter whose effect degree on an execution time of the distributed computing job is higher than an effect degree threshold.

Step 101 specifically includes: randomly generating multiple configuration item combinations within a parameter value range of each of configuration items, where the configuration items include a configuration item of a key parameter and a configuration item of an auxiliary parameter; determining, based on any one of the job programs of the distributed computing job with reference to the configuration item combinations, an execution time corresponding to each of the configuration item combinations; determining a key parameter based on the execution time by using a parameter of p-value and an impurity of a regression tree; and determining the key parameter configuration set 203 based on the key parameter.

Through observation, it is found that a common parameter of a computing framework 201 has different performance effects on different jobs. For example, a "data compression" configuration item indicates whether data is compressed before data transmission, so as to reduce network overheads of data transmission. This configuration item has a significant impact on execution efficiency of a data-intensive job, but has little impact on a computing-intensive job. Therefore, in order to find an optimal configuration 204 more quickly and accurately, a key configuration is selected for optimization, to reduce overheads of configuration search.

Figure 3:
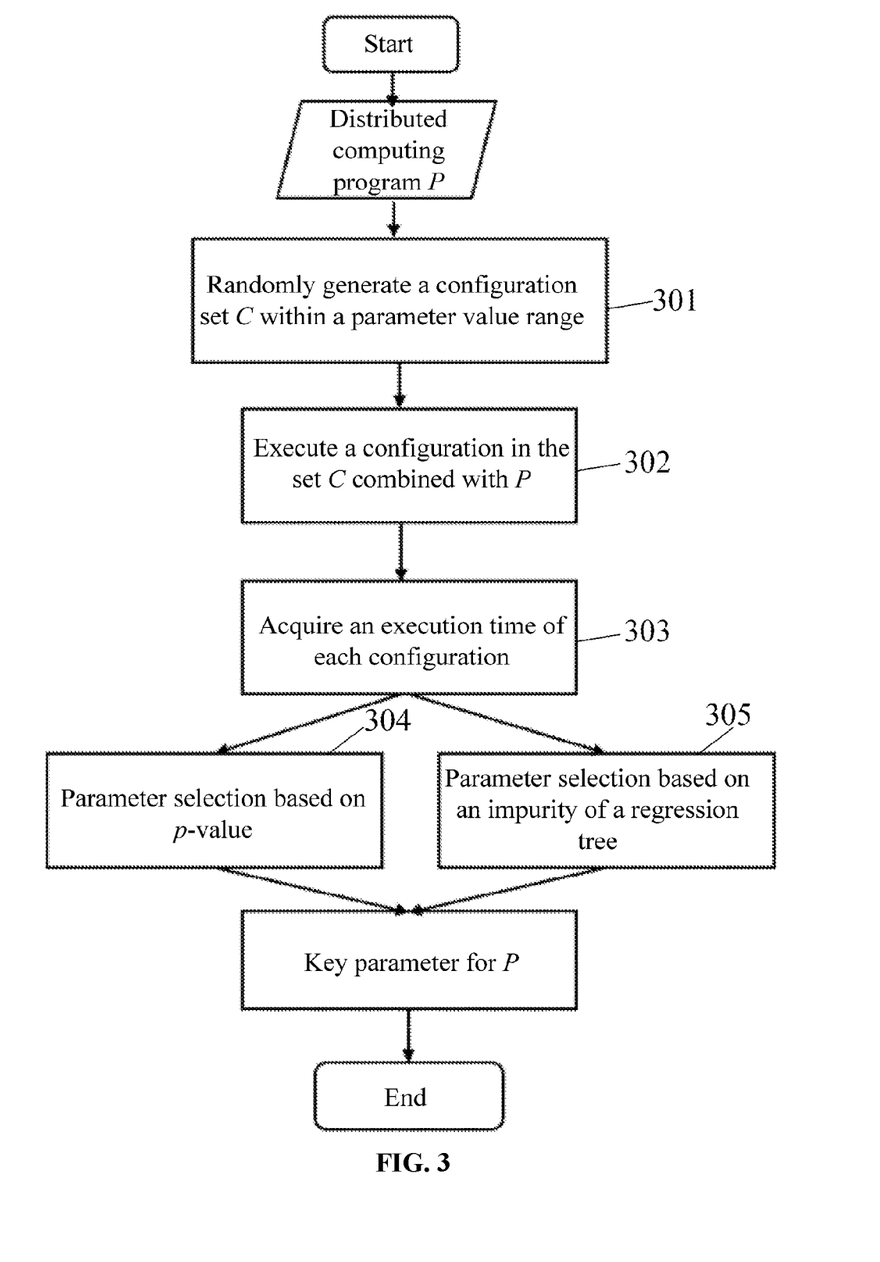
FIG. 3 is a flowchart for selecting a key parameter according to the present disclosure.

As shown in FIG. 3, based on the method, in step 301, configurations are randomly generated within a reasonable parameter value range for a to-be-optimized distributed job, and the configurations are stored in a configuration set C. In step 302, a program P is successively executed in combination with the generated configurations, to obtain an execution time corresponding to each configuration in step 304. Two correlation calculation methods: p-value (in step 304) and an impurity of a regression tree (in step 305) are comparatively used, to obtain a parameter with a relatively great impact on the execution time of the program, that is, a key parameter. This process only needs to be performed once for a same distributed computing program.

Step 102: Obtain a cluster status during execution of the distributed computing job, randomly generate a sample data set based on the key parameter configuration set 203 and the cluster status, and establish a performance prediction model by inputting a key parameter configuration item combination in the sample data set and the cluster status and by outputting the execution time corresponding to each of the key parameter configuration item combinations. The performance prediction module is configured to determine a key parameter configuration item combination with a shortest execution time.

Step 102 specifically includes: selecting multiple shallow fully connected neural networks as first-layer neural networks of the performance prediction model by using a cross-validation method, constructing a dual-layer model by using output of each first-layer neural network as input of a second-layer linear regression layer, and training the sample data set by using the dual-layer model; outputting a prediction result of the first-layer neural network by using the key parameter configuration item combination in the sample data set and the cluster status as input of the first-layer neural networks; and establishing the performance prediction model by learning and training based on a linear regression model by mapping the prediction result as input of the second-layer linear regression layer to an execution time of the sample data set and by outputting the execution time corresponding to the key parameter configuration item combination.

The present disclosure uses a neural network-based method to train a model that can predict a job execution time. To obtain training data, based on the method, a configuration is obtained by randomly combining within a value range of a key parameter. A job is executed with reference to input data with different sizes, to obtain an execution time under the configuration and an input data amount, and a cluster status (for example, a size of load)

during execution of the job, so as to obtain a sample set D. In addition, dozens of shallow fully connected neural networks of different sizes are preset in a training component of the model, and are denoted as a neural network library N. Then, a two-layer training method is used to fit the current sample set D.

Figure 4:
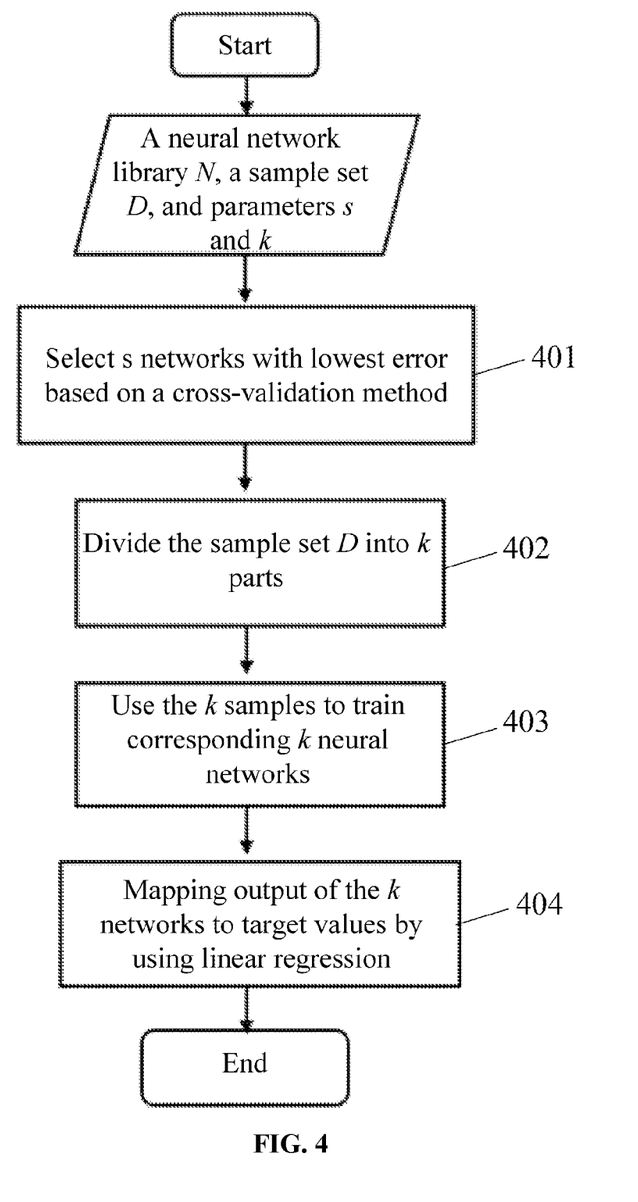
FIG. 4 is a flowchart for training a performance prediction model according to the present disclosure.

As shown in FIG. 4, a network with a relatively small error needs to be first selected from the neural network library N. For a labeled sample set, based on the method, the cross-validation method is adopted to select S networks from the neural network library N (in step 401). After selection is completed, training of a first-layer model is performed. Based on a network quantity n selected by the first-layer model, the sample set D is divided into n parts (in step 402). An ith network si in the first-layer model is sequentially trained on the sample set D to $D_i$ by using a stacking method, and prediction is performed on $D_i$. The sample set D is divided into n equal parts, and $D_i$ represents an ith part and is used for training the network $s_i$ (in step 403). Prediction results of all networks on a corresponding $D_i$ are combined as output of the first-layer model, and then are learned by using the linear regression model and mapped to the execution time of the sample (in step 404). This step is training of a second-layer model. This method improves accuracy and generalization capability of the model prediction, and reduces an error of a system in actual use.

Step 103: Search for an optimal configuration 204 in a current cluster status based on the performance prediction model by using a multi-objective genetic algorithm and an optimization module configured with an optimal configuration selection strategy. The optimization module is configured to simultaneously optimize the execution time and an amount of memory resource usage.

Figure 6:
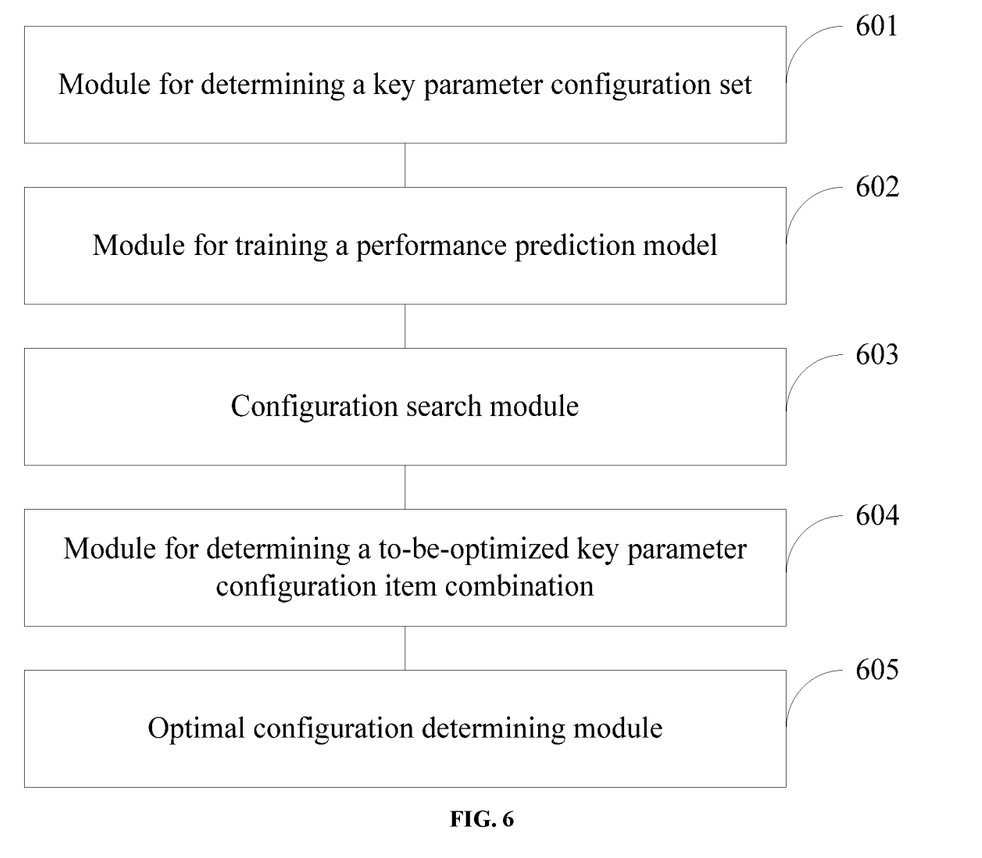
FIG. 6 is a structural diagram of a system for optimizing a parameter configuration of a distributed computing job according to the present disclosure, where

After model training is completed, a job execution time can be accurately predicted for a job whose input data amount and configuration are known. Therefore, a job with a relatively short execution time can be found in parameter space by using a search algorithm. The present disclosure aims to reduce a memory resource waste while reducing the job execution time. Therefore, the module optimizes the execution time and an amount of resource usage simultaneously by using a multi-objective optimization method. By using the multi-objective genetic algorithm and the optimal configuration selection strategy, the configuration optimization module 603 can perform configuration optimization services for incoming jobs online.

Step 104: Obtain a job program of a to-be-optimized distributed computing job and a cluster status during execution of the to-be-optimized distributed computing job, and determine a to-be-optimized key parameter configuration item combination based on the job program of the to-be-optimized distributed computing job.

Step 105: Input, to the performance prediction model, the to-be-optimized key parameter configuration item combination and the cluster status during execution of the to-be-optimized distributed computing job, and output a key parameter configuration item combination with a shortest execution time of the to-be-optimized distributed computing job. A key parameter configuration of each key parameter configuration item in the key parameter configuration item combination with a shortest execution time of the to-be-optimized distributed computing job is an optimal configuration 204 of the to-be-optimized distributed computing job.

Figure 5:
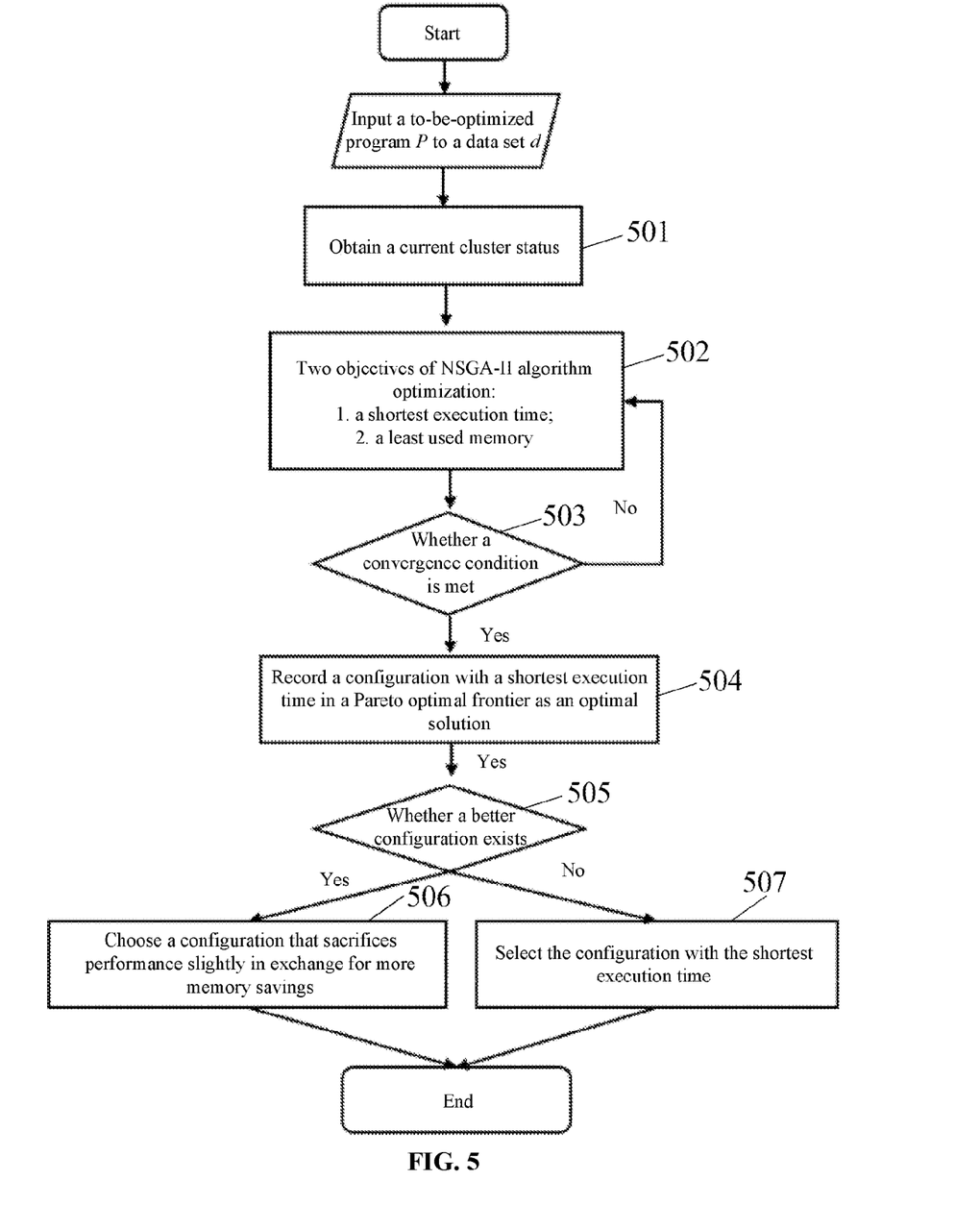
FIG. 5 is a flowchart of configuration optimization according to the present disclosure.

Step 105 specifically includes: determining an optimization result by inputting the randomly generated to-be-optimized key parameter configuration item combination and the sampled cluster status during execution of the to-be-optimized distributed computing job to the performance prediction model (in step 501) and by optimizing the execution time of the to-be-optimized distributed computing job based on an NSGA-II algorithm with an objective of the shortest execution time and the least amount of memory resource usage (in step 502); and determining whether the optimization result meets a convergence condition (in step 503), and if yes, using the key parameter configuration item combination with a shortest execution time as an optimal solution (in step 504), or if not, re-optimizing the execution time of the to-be-optimized distributed computing job by using the NSGA-II algorithm; and determining whether the optimal configuration exists in the optimal solution (in step 505), and if yes, obtaining a key parameter configuration item combination with the least amount of memory resource usage by discarding a key parameter configuration item with a performance level lower than a performance level threshold (in step 506), or if not, outputting the key parameter configuration item combination with a shortest execution time of the to-be-optimized distributed computing job (in step 507). Searching is an iterative process. If an obtained optimal configuration basically does not change after multiple iterations, it is considered that searching converges.

As shown in FIG. 5, a parameter configuration is treated as a population individual in the multi-objective genetic algorithm. The performance model may sense cluster load. Therefore, an execution time can be directly predicted based on current cluster load, an input data volume, and a configuration. The execution time and an amount of memory usage are used to determine fitness of an individual (configuration). It is defined that an individual with faster execution speed and less amount of memory usage has higher fitness. Based on a genetic operation, a mutation operation, and the like, the population individual (configuration) is gradually improved (faster execution speed and less amount of memory usage).

For a multi-objective optimization problem, a Pareto optimal frontier usually needs to be considered. After searching converges, a configuration in the Pareto optimal frontier (an optimal configuration set) can no longer improve another target without losing one target. Therefore, a configuration optimizer 205 supports using two parameters a maximum performance loss (MaxPL) and a minimum memory gain (MinMG) to control configuration selection. By default, the configuration optimizer 205 records a configuration with the shortest execution time as an optimal solution. However, for the optimal frontier, if there is a configuration with highest execution efficiency, a configuration with a least MinMG, that is, with reduced memory overheads is obtained by sacrificing a configuration with a ratio of the MaxPL. Among these configurations, a point closest to an origin is chosen as an optimal configuration 204.

The NSGA-II algorithm is efficient and key parameter selection reduces sample complexity. An average configuration optimization time of the configuration optimizer 205 is 5.3 seconds. Therefore, a configuration optimization service considering the cluster status can be provided for a distributed computing job at a minute level.

FIG. 6 is a structural diagram of a system for optimizing a parameter configuration of a distributed computing job according to the present disclosure. As shown in FIG. 6, a system for optimizing a parameter configuration of a distributed computing job includes: a module for determining a key parameter configuration set 601, a module for training a performance prediction model 602, a configuration search module 603, a module for determining a to-be-optimized key parameter configuration item combination 604, and an optimal configuration determining module 605.

The module for determining a key parameter configuration set 601 is configured to: obtain job programs of different distributed computing jobs, and determine a key parameter configuration set based on the job programs of the different distributed computing jobs. The key parameter configuration set includes multiple key parameter configuration item combinations and an execution time corresponding to each of the key parameter configuration item combinations. Each key parameter configuration item combination includes configuration items of multiple key parameters. The key parameter is a parameter whose effect degree on an execution time of the distributed computing job is higher than an effect degree threshold.

The module for determining a key parameter configuration set 601 specifically includes: a unit for generating a configuration item combination, an execution time determining unit, a key parameter determining unit, and a unit for determining a key parameter configuration set. The unit for generating a configuration item combination is configured to randomly generate multiple configuration item combinations within a parameter value range of each of configuration items. The configuration items include a configuration item of a key parameter and a configuration item of an auxiliary parameter. The execution time determining unit is configured to determine, based on any one of the job programs of the distributed computing job with reference to the configuration item combinations, an execution time corresponding to each of the configuration item combinations. The key parameter determining unit is configured to determine a key parameter based on the execution time by using a parameter of p-value and an impurity of a regression tree. The unit for determining a key parameter configuration set is configured to determine a key parameter configuration set based on the key parameter.

The module for training a performance prediction model 602 is configured to: obtain a cluster status during execution of the distributed computing job, randomly generate a sample data set based on the key parameter configuration set and the cluster status, and establish a performance prediction model by inputting a key parameter configuration item combination in the sample data set and the cluster status and by outputting the execution time corresponding to each of the key parameter configuration item combinations. The performance prediction module is configured to determine a key parameter configuration item combination with a shortest execution time.

The module for training a performance prediction model 602 specifically includes: a unit for constructing a neural network-based double-layer model, a unit for outputting a prediction result of a first-layer neural network, and a unit for constructing a performance prediction model. The unit for constructing a neural network-based double-layer model is configured to: select multiple shallow fully connected neural networks as first-layer neural networks of the performance prediction model by using a cross-validation method, construct a dual-layer model by using output of each first-layer neural network as input of a second-layer linear regression layer, and train the sample data set by using the dual-layer model. The unit for outputting a prediction result of a first-layer neural network is configured to output a prediction result of the first-layer neural network by using the key parameter configuration item combination in the sample data set and the cluster status as input of the first-layer neural networks. The unit for constructing a performance prediction model is configured to establish the performance prediction model by learning and training based on a linear regression model by mapping the prediction result as input of the linear regression layer to an execution time of the sample data set and by outputting the execution time corresponding to each key parameter configuration item combination.

The configuration search module 603 is configured to search for an optimal configuration in a current cluster status based on the performance prediction model by using a multi-objective genetic algorithm and an optimization module configured with an optimal configuration selection strategy. The optimization module is configured to simultaneously optimize the execution time and an amount of memory resource usage.

The module for determining a to-be-optimized key parameter configuration item combination 604 is configured to: obtain a job program of a to-be-optimized distributed computing job and a cluster status during execution of the to-be-optimized distributed computing job, and determine a to-be-optimized key parameter configuration item combination based on the job program of the to-be-optimized distributed computing job.

The optimal configuration determining module 605 is configured to input, to the performance prediction model, the to-be-optimized key parameter configuration item combination and the cluster status during execution of the to-be-optimized distributed computing job, and output a key parameter configuration item combination with a shortest execution time of the to-be-optimized distributed computing job. A key parameter configuration of each key parameter configuration item in the key parameter configuration item combination with a shortest execution time of the to-be-optimized distributed computing job is an optimal configuration of the to-be-optimized distributed computing job.

The optimal configuration determining module 605 specifically includes: an optimization result determining unit, a first judgment unit, an optimal solution determining unit, a second judgment unit, a first unit for determining a key parameter configuration item combination, and a second unit for determining a key parameter configuration item combination. The optimization result determining unit is configured to determine an optimization result by inputting the randomly generated to-be-optimized key parameter configuration item combination and the sampled cluster status during execution of the to-be-optimized distributed computing job to the performance prediction model and by optimizing the execution time of the to-be-optimized distributed computing job based on an NSGA-II algorithm with an objective of the shortest execution time and the least amount of memory resource usage. The first judgment unit is configured to determine whether the optimization result meets a convergence condition, to obtain a first determining result. The convergence condition is that searching stops if an optimal configuration obtained by searching based on the genetic algorithm does not change. The optimal solution determining unit is configured to use the key parameter configuration item combination with a shortest execution time as an optimal solution when the first determining result indicates that the optimization result meets the convergence condition. The second judgment unit is configured to determine whether the optimal configuration exists in the optimal solution, to obtain a second determining result. The first unit for determining a key parameter configuration item combination is configured to: if the second determining result indicates that the optimal configuration exists in the optimal solution, obtain a key parameter configuration item combination with the least amount of memory resource usage by discarding a key parameter configuration item with a performance level lower than a performance level threshold. The second unit for determining a key parameter configuration item combination is configured to: if the second determining result indicates that the optimal configuration does not exist in the optimal solution, output the key parameter configuration item combination with a shortest execution time of the to-be-optimized distributed computing job.

The method and system for optimizing a parameter configuration of a distributed computing job provided in the present disclosure can simultaneously optimize the execution time and the amount of memory usage of the job. Further, a load status of a distributed cluster is considered, so as to provide the optimal configuration in the current cluster status for the job, that is, job-level configuration optimization.

Each example of the present specification is described in a progressive manner, each example focuses on the difference from other examples, and the same and similar parts between the examples may refer to each other. For a system disclosed in the examples, since it corresponds to the method disclosed in the examples, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present description shall not be construed as limitations to the present disclosure.

What is claimed is:

1. A method for optimizing a parameter configuration of a distributed computing job, comprising:

obtaining job programs of different distributed computing jobs, and determining a key parameter configuration set based on the job programs of the different distributed computing jobs, wherein the key parameter configuration set comprises multiple key parameter configuration item combinations and an execution time corresponding to each of the key parameter configuration item combinations, each of the key parameter configuration item combinations comprises configuration items of multiple key parameters, configuration item of each key parameter is randomly generated within a value range of the key parameter, and each of the key parameters is a parameter whose effect degree on an execution time of each of the distributed computing jobs is higher than an effect degree threshold;

obtaining a cluster status during execution of each of the distributed computing jobs, randomly generating a sample data set based on the key parameter configuration set and the cluster status, and establishing a performance prediction model by inputting a key parameter configuration item combination comprised in the sample data set and the cluster status and by outputting the execution time corresponding to each of the key parameter configuration item combinations, wherein the performance prediction model is configured to determine a key parameter configuration item combination with a shortest execution time, and the cluster status is a load size of a cluster;

searching for an optimal configuration in a current cluster status based on the performance prediction model by using a multi-objective genetic algorithm and an optimization module configured with an optimal configuration selection strategy, wherein the optimization module is configured to simultaneously optimize the execution time and an amount of memory resource usage and the optimal configuration is a configuration with shortest execution time;

obtaining a job program of a to-be-optimized distributed computing job and a cluster status during execution of the to-be-optimized distributed computing job, and determining a to-be-optimized key parameter configuration item combination based on the job program of the to-be-optimized distributed computing job; and inputting, to the performance prediction model, the to-be-optimized key parameter configuration item combination and the cluster status during execution of the to-be-optimized distributed computing job, and outputting a key parameter configuration item combination with a shortest execution time of the to-be-optimized distributed computing job, wherein a key parameter configuration of each key parameter configuration item in the key parameter configuration item combination with a shortest execution time of the to-be-optimized distributed computing job is an optimal configuration of the to-be-optimized distributed computing job;

wherein the inputting, to the performance prediction model, the to-be-optimized key parameter configuration item combination and the cluster status during execution of the to-be-optimized distributed computing job, and outputting a key parameter configuration item combination with a shortest execution time of the to-be-optimized distributed computing job comprises:

determining an optimization result by inputting the to-be-optimized key parameter configuration item combination and the sampled cluster status during execution of the to-be-optimized distributed computing job to the performance prediction model and by optimizing the execution time of the to-be-optimized distributed computing job based on a fast non-dominated sorting genetic algorithm II (NSGA-II) algorithm with an objective of the shortest execution time and the least amount of memory resource usage;

determining whether the optimization result meets a convergence condition, to obtain a first determining result, wherein the convergence condition is that searching stops if an optimal configuration obtained by searching based on the genetic algorithm does not change;

using the key parameter configuration item combination with a shortest execution time as an optimal solution when the first determining result indicates that the optimization result meets the convergence condition;

determining whether a configuration in which loss of performance is less than a maximum performance loss (MaxPL) and memory saving is larger than a minimum memory gain (MinMG) exists in the optimal solution, to obtain a second determining result; and if the second determining result indicates that the optimal configuration exists in the optimal solution, obtaining a key parameter configuration item combination with the least amount of memory resource usage by discarding a key parameter configuration item with a performance level lower than a performance level threshold, or if the second determining result indicates that the optimal configuration does not exist in the optimal solution, outputting the key parameter configuration item combination with a shortest execution time of the to-be-optimized distributed computing job.

2. The method for optimizing a parameter configuration of a distributed computing job according to claim 1, wherein the obtaining job programs of different distributed computing jobs, and determining a key parameter configuration set based on the job programs of the different distributed computing jobs comprises:

randomly generating multiple configuration item combinations within a parameter value range of each of configuration items, wherein the configuration items comprise a configuration item of a key parameter and a configuration item of an auxiliary parameter;

determining, based on any one of the job programs of the different distributed computing jobs with reference to the configuration item combinations, an execution time corresponding to each of the configuration item combinations;

determining a key parameter based on the execution time by using a parameter of p-value and an impurity of a regression tree; and determining the key parameter configuration set based on the key parameter.

3. The method for optimizing a parameter configuration of a distributed computing job according to claim 1, wherein the obtaining a cluster status during execution of each of the distributed computing jobs, randomly generating a sample data set based on the key parameter configuration set and the cluster status, and establishing a performance prediction model by inputting a key parameter configuration item combination comprised in the sample data set and the cluster status and by outputting the execution time corresponding to each of the key parameter configuration item combinations comprises:

selecting multiple shallow fully connected neural networks as first-layer neural networks of the performance prediction model by using a cross-validation method, constructing a dual-layer model by using output of each of the first-layer neural networks as input of a second-layer linear regression layer, and training the sample data set by using the dual-layer model;

outputting a prediction result of each of the first-layer neural networks by using the key parameter configuration item combination in the sample data set and the cluster status as input of the first-layer neural networks; and establishing the performance prediction model by learning and training based on a linear regression model by mapping the prediction result as input of the second-layer linear regression layer to an execution time of the sample data set and by outputting the execution time corresponding to each of the key parameter configuration item combinations.

4. A system for optimizing a parameter configuration of a distributed computing job, comprising a processor and a memory storing program codes, wherein the processor performs the stored program codes for:

obtaining job programs of different distributed computing jobs, and determining a key parameter configuration set based on the job programs of the different distributed computing jobs, wherein the key parameter configuration set comprises multiple key parameter configuration item combinations and an execution time corresponding to each of the key parameter configuration item combinations, each of the key parameter configuration item combinations comprises configuration items of multiple key parameters, configuration item of each key parameter is randomly generated within a value range of the key parameter, and each of the key parameters is a parameter whose effect degree on an execution time of each of the distributed computing jobs is higher than an effect degree threshold;

obtaining a cluster status during execution of each of the distributed computing jobs, randomly generating a sample data set based on the key parameter configuration set and the cluster status, and establishing a performance prediction model by inputting a key parameter configuration item combination comprised in the sample data set and the cluster status and by outputting the execution time corresponding to each of the key parameter configuration item combinations, wherein the performance prediction model is configured to determine a key parameter configuration item combination with a shortest execution time, and the cluster status is a load size of a cluster;

searching for an optimal configuration in a current cluster status based on the performance prediction model by using a multi-objective genetic algorithm and an optimization module configured with an optimal configuration selection strategy, wherein the optimization module is configured to simultaneously optimize the execution time and an amount of memory resource usage, and the optimal configuration is a configuration with shortest execution time;

obtaining a job program of a to-be-optimized distributed computing job and a cluster status during execution of the to-be-optimized distributed computing job, and determining a to-be-optimized key parameter configuration item combination based on the job program of the to-be-optimized distributed computing job; and inputting, to the performance prediction model, the to-be-optimized key parameter configuration item combination and the cluster status during execution of the to-be-optimized distributed computing job, and outputting a key parameter configuration item combination with a shortest execution time of the to-be-optimized distributed computing job, wherein a key parameter configuration of each key parameter configuration item in the key parameter configuration item combination with a shortest execution time of the to-be-optimized distributed computing job is an optimal configuration of the to-be-optimized distributed computing job;

wherein the inputting, to the performance prediction model, the to-be-optimized key parameter configuration item combination and the cluster status during execution of the to-be-optimized distributed computing job, and outputting a key parameter configuration item combination with a shortest execution time of the to-be-optimized distributed computing job, comprises:

determining an optimization result by inputting the to-be-optimized key parameter configuration item combination and the sampled cluster status during execution of the to-be-optimized distributed computing job to the performance prediction model and by optimizing the execution time of the to-be-optimized distributed computing job based on an NSGA-II algorithm with an objective of the shortest execution time and the least amount of memory resource usage;

determining whether the optimization result meets a convergence condition, so as to obtain a first determining result, wherein the convergence condition is that searching stops if an optimal configuration obtained by searching based on the genetic algorithm does not change;

using the key parameter configuration item combination with a shortest execution time as an optimal solution when the first determining result indicates that the optimization result meets the convergence condition;

determining whether a configuration in which loss of performance is less than a maximum performance loss (MaxPL) and memory saving is larger than a minimum memory gain (MinMG) exists in the optimal solution, so as to obtain a second determining result;

determining a key parameter configuration item combination: if the second determining result indicates that the optimal configuration exists in the optimal solution, obtain a key parameter configuration item combination with the least amount of memory resource usage by discarding a key parameter configuration item with a performance level lower than a performance level threshold; and determining a key parameter configuration item combination: if the second determining result indicates that the optimal configuration does not exist in the optimal solution, output the key parameter configuration item combination with a shortest execution time of the to-be-optimized distributed computing job.

5. The system for optimizing a parameter configuration of a distributed computing job according to claim 4, wherein the obtaining job programs of different distributed computing jobs, and determining a key parameter configuration set based on the job programs of the different distributed computing jobs comprises:

randomly generating multiple configuration item combinations within a parameter value range of each of configuration items, wherein the configuration items comprise a configuration item of a key parameter and a configuration item of an auxiliary parameter;

determining, based on any one of the job programs of the distributed computing jobs with reference to the configuration item combinations, an execution time corresponding to each of the configuration item combinations;

determining a key parameter based on the execution time by using a parameter of p-value and an impurity of a regression tree; and determining a key parameter configuration set based on the key parameter.

6. The system for optimizing a parameter configuration of a distributed computing job according to claim 4, wherein the obtaining a cluster status during execution of each of the distributed computing jobs, randomly generating a sample data set based on the key parameter configuration set and the cluster status, and establishing a performance prediction model by inputting a key parameter configuration item combination comprised in the sample data set and the cluster status and by outputting the execution time corresponding to each of the key parameter configuration item combinations comprises:

selecting multiple shallow fully connected neural networks as first-layer neural networks of the performance prediction model by using a cross-validation method, constructing a dual-layer model by using output of each of the first-layer neural networks as input of a second-layer linear regression layer, and training the sample data set by using the dual-layer model;

outputting a prediction result of each of the first-layer neural networks by using the key parameter configuration item combination in the sample data set and the cluster status as input of the first-layer neural networks; and establishing the performance prediction model by learning and training based on a linear regression model by mapping the prediction result as input of the linear regression layer to an execution time of the sample data set and by outputting the execution time corresponding to each of the key parameter configuration item combinations.

* * * * *